US005186006A

United States Patent [19]

Petty

[11] Patent Number: 5,186,006

[45] Date of Patent: Feb. 16, 1993

[54] MOUNTING FOR CERAMIC SCROLL

[75] Inventor: Jack D. Petty, Indianapolis, Ind.

[73] Assignee: General Motors Corporation, Detroit, Mich.

[21] Appl. No.: 854,103

[22] Filed: Mar. 19, 1992

[51] Int. Cl.[5] F02C 3/04

[52] U.S. Cl. 60/753; 60/39.32

[58] Field of Search 60/753, 39.31, 39.32, 60/752, 39.83; 416/241 B, 244 A

[56] References Cited

U.S. PATENT DOCUMENTS 3,999,376 12/1976 Jeryan et al. 60/753
4,326,835 4/1982 Wertz .
4,373,326 2/1983 Smale .
4,639,194 1/1987 Bell, III et al. .
4,748,806 6/1988 Drobny 60/39.32
5,105,625 4/1992 Bell, III et al. 60/753

*Primary Examiner*—Edward K. Look
*Assistant Examiner*—James A. Larson
*Attorney, Agent, or Firm*—Saul Schwartz

[57] ABSTRACT

A mounting for a ceramic scroll on a metal engine block of a gas turbine engine includes a first ceramic ring and a pair of cross key connections between the first ceramic ring, the ceramic scroll, and the engine block. The cross key connections support the scroll on the engine block independent of relative radial thermal growth and for bodily movement toward an annular mounting shoulder on the engine. The scroll has an uninterrupted annular shoulder facing the mounting shoulder on the engine block. A second ceramic ring is captured between mounting shoulder and the uninterrupted shoulder on the scroll when the latter is bodily shifted toward the mouting shoulder to define a gas seal between the scroll and the engine block.

4 Claims, 3 Drawing Sheets

MOUNTING FOR CERAMIC SCROLL

This invention was made in the course of work under a contract or subcontract with the United States Department of Energy.

FIELD OF THE INVENTION

This invention relates to a mounting for a ceramic scroll on a metal engine block of a gas turbine engine.

BACKGROUND OF THE INVENTION

In hot sections of gas turbine engines where temperatures may exceed 2500 degrees F., ceramics are preferable to alloy metals because the former do not require air cooling for acceptable durability and the latter do. A scroll, for example, defining a transition from tangential discharge of a combustor to an axial annular nozzle is an ideal candidate for substitution of ceramic for alloy metal. Mounting a ceramic scroll on a metal engine block, however, is challenging because of the different physical properties, including thermal expansion characteristics, of the two materials. U.S. Pat. application SN 07/618,338, filed 23 November 1990 by A. H. Bell III et al and assigned to the assignee of this invention, describes a mounting for a ceramic scroll on a metal engine block of a gas turbine engine. A mounting according to this invention is an alternative to the mounting described in the aforesaid patent application and affords a relatively simple and effective connection between a ceramic scroll and a metal engine block in a gas turbine engine.

SUMMARY OF THE INVENTION

This invention is a new and improved mounting of a ceramic scroll on a metal engine block of a gas turbine engine. The scroll has a ceramic shell defining a volute chamber with an annular discharge nozzle defined between concentric inner and outer cylindrical wall segments of the shell. A first ceramic ring of the mounting according to this invention is connected by a first set of cross keys to the inner ceramic wall segment and by a second set of cross keys to a steel spider bolted to the engine block. The cross key connections support the scroll on the engine block for bodily shiftable movement toward an annular mounting shoulder on the engine block and effectively accommodate relative radial thermal growth between the scroll and the engine block to foreclose thermal growth induced stress concentrations. The inner cylindrical wall segment has a first annular shoulder facing the mounting shoulder on the engine block. A second ceramic ring of the mounting according to this invention is disposed between the first annular shoulder and the mounting shoulder on the engine block and has a second annular shoulder facing the first annular shoulder. A retaining plate outside the first ceramic ring clamps the second ceramic ring against the mounting shoulder on the engine block by clamping the first annular shoulder on the scroll against the second annular shoulder on the second ceramic ring.

DESCRIPTION OF A PREFERRED EMBODIMENT

Figure 1:
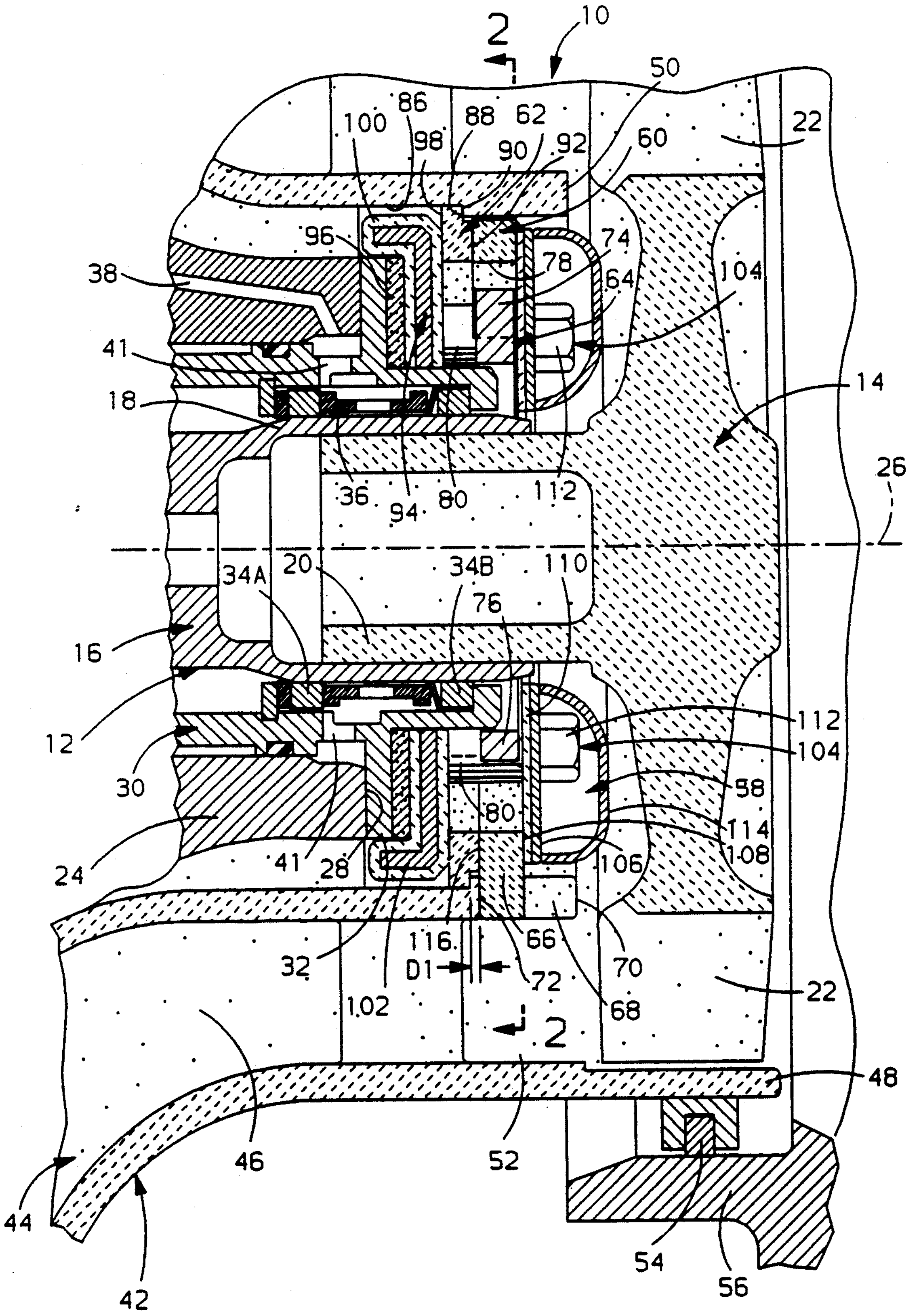
FIG. 1 is a fragmentary elevational view of the hot section of a gas turbine engine having a ceramic scroll mounting according to this invention.

Referring to FIG. 1, a partially d hot section (10) of a gas turbine engine includes a single stage turbine rotor (12) which may be as described in U.S. Pat. No. 4,639,194, issued 27 June 1987 to A. H. Bell III, et al and assigned to the assignee of this invention. The turbine rotor includes a ceramic turbine wheel (14) and an alloy steel shaft (16). A tubular end (18) of the alloy steel shaft is attached to a tubular stem (20) of the turbine wheel. The turbine wheel (14) has a plurality of turbine blades (22) around its circumference.

The engine block is made of alloy metal and has a structurally rigid cylindrical wall (24) aligned on a primary axis (26) of the engine block. The cylindrical wall terminates at an annular mounting shoulder (28) in a plane perpendicular to the primary axis. A generally tubular, metallic seal carrier (30) is disposed in the cylindrical wall (24) with a radial annular flange (32) of the carrier seating against the annular mounting shoulder (28).

Bearings, not shown, support the turbine rotor on the engine block for rotation about the primary axis (26). A pair of high temperature seal rings (34A–B) are disposed between the carrier (30) and the tubular end (18) of the alloy steel shaft (16) and are separated by a spacer sleeve (36). Cooling air is supplied to the seal rings (34A–B) through a passage (38) in the cylindrical wall (24) of the engine block and through a plurality of circumferentially spaced holes (41) in the carrier (30).

A fragmentarily illustrated ceramic scroll (42) of the gas turbine engine has a ceramic shell (44) defining a volute chamber (46) around the primary axis (26) and around the cylindrical wall (24) of the engine block. The shell (44) has a generally cylindrical outer wall segment (48) and a concentric generally cylindrical inner wall segment (50). The outer wall segment (48) extends over the turbine blades (22) and cooperates with the inner wall segment (50) in defining therebetween a bladed annular nozzle (52) through which hot gas is discharged from the volute chamber (46) in the direction of the axis (26) toward the turbine blades (22). A seal (54) between the outer wall segment (48) and a fragmentarily illustrated wall (56) of the engine block minimizes hot gas leakage. The ceramic scroll (42) is connected to the engine block by a mounting (58) according to this invention.

The mounting (58) includes a first or axially outboard ceramic ring (60), a second or axially inboard ceramic ring (62), and a steel spider (64). The first ceramic ring (60) is connected to the inner wall segment (50) of the shell (44) by a first set of cross keys including a plurality of radial lugs (66) on the first ceramic ring and a corresponding plurality of longitudinal slots (68) in an annular end face (70) of the inner wall segment (50) of the scroll. Each of the slots (68) has a bottom wall (72) in a common first plane perpendicular to the primary axis (26).

The spider (64) is disposed inside the first ceramic ring (60) and connected to the latter by a second set of cross keys including a plurality of radial lugs (74) on a ring portion (76) of the spider (64) and a corresponding plurality of radial slots (78) in the first ceramic ring. The spider (64) further includes a plurality of tubular spacers (80) integral with the ring portion (76). The spacers bear against the annular flange (32) on the carrier (30) and are aligned with respective ones of a plurality of holes in the flange (32) and threaded holes in the cylindrical wall (24) of the engine block, only a representative hole (82) in the flange and a representative threaded hole (84) in the engine block being visible in FIG. 3.

Figure 3:
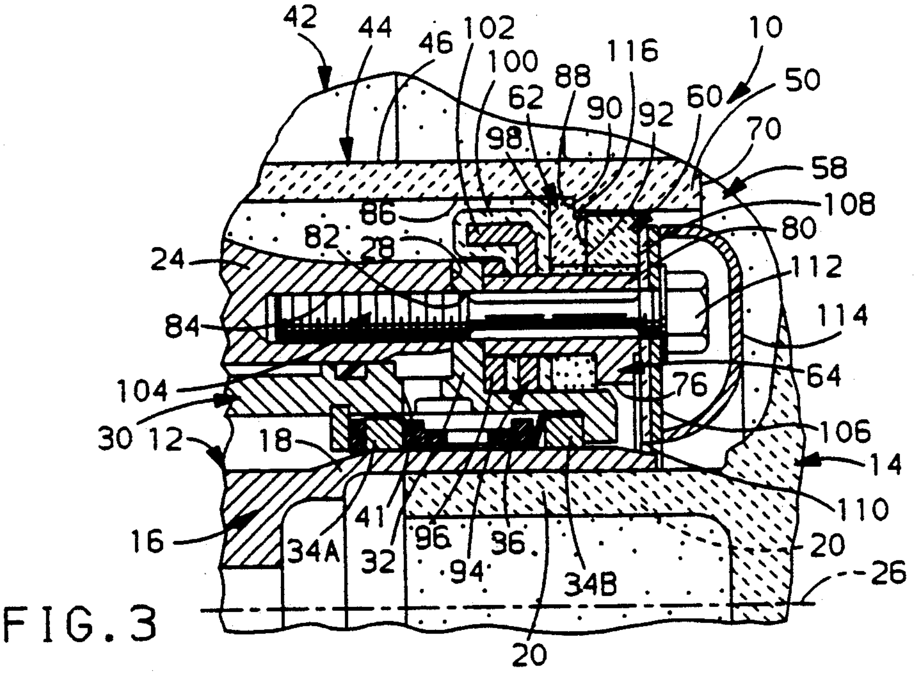
FIG. 3 is a sectional view taken generally along the plane indicated by lines 3—3 in FIG. 2.
Figure 4:
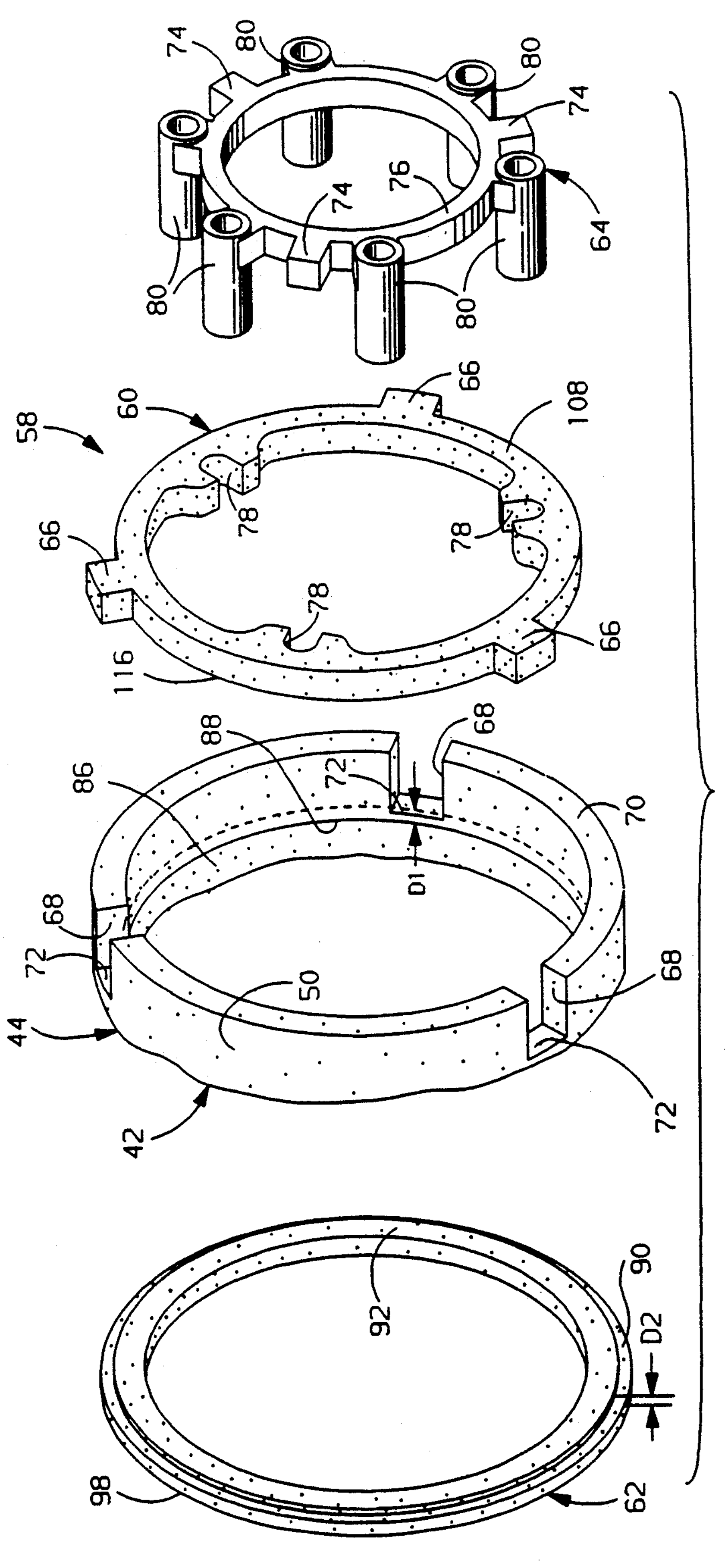
FIG. 4 is a fragmentary, exploded perspective view of the ceramic scroll mounting according to this invention.

As seen best in FIGS. 1, 3 and 4, the cylindrical inner wall segment (50) of the shell (44) flares radially out adjacent the nozzle (52). A cylindrical counterbore (86) in the inner wall segment (50) terminates at a first uninterrupted annular shoulder (88) on the inner wall segment in a second plane perpendicular to the primary axis (26) and facing the mounting shoulder (28) on the engine block. The second plane is separated by a dimension D1, FIGS. 1, 4, from the aforesaid first plane in which are located the bottoms (72) of the slots (68).

The second ceramic ring (62) is disposed inside the counterbore (86) and has a second uninterrupted annular shoulder (90) thereon facing the first annular shoulder (88) on the inner wall segment. The second shoulder (90) is set-back from an annular face (92) of the second ceramic ring by a dimension D2, FIG. (4).

An annular metal plate (94) and a annular porous element (96) are stacked between an annular face (98) of the second ceramic ring (62) and the flange (32) on the carrier (30). The metal plate (94) has a thermal barrier ceramic coating (100) and a heat shielding edge (102) shrouding the outside diameter of the porous element (96). The porous element (96) is made of high temperature resistant material, available commercially from Union Carbide Corporation under their tradename Grafoil, and is permanently deformable or compressible in the direction of the primary axis (26). The metal plate and the porous element are perforated to provide clearance around the tubular spacers (80) of the spider.

Figure 2:
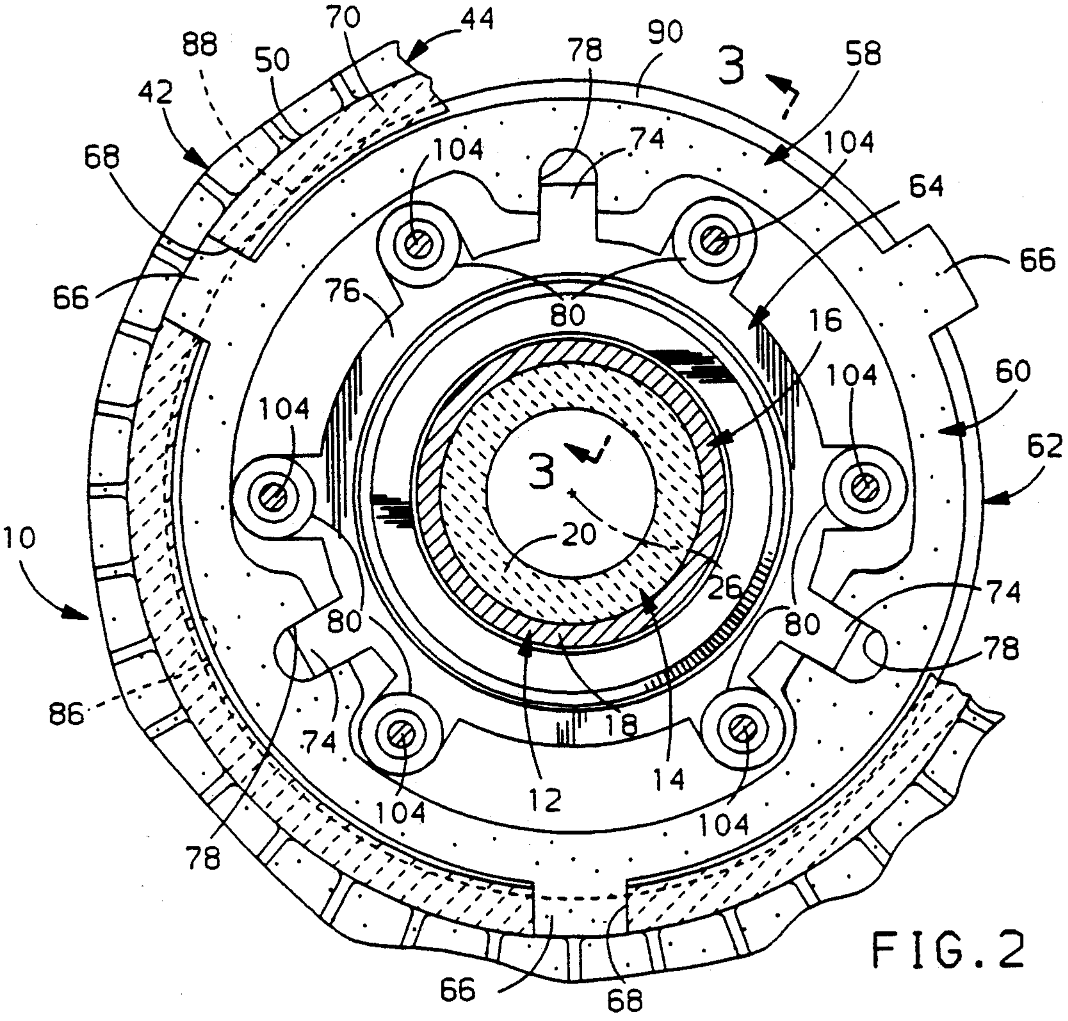
FIG. 2 is a sectional view taken generally along the plane indicated by lines 2—2 in FIG. 1.

As seen best in FIGS. 2—3, the tubular spacers (80) of the spider (64) receive respective ones of a plurality of threaded rods (104) which project through the spacers and the aligned holes (82) in the flange (32) on the carrier and are threaded into the holes (84) in the cylindrical wall of the engine block. A perforated annular retainer plate (106) is received over the ends of the rods (104) within the inner cylindrical wall segment (50) of the scroll and seats against the axially outboard ends of the spacers (80) and against an axially outboard face (108) of the first ceramic ring (60). The retainer plate has a ceramic thermal barrier coating (110) on one side thereof. A plurality of nuts (112) are threaded on the rods (104) axially outboard of the retainer plate (106) and are concealed by a heat shield (114) tack welded to the retainer plate.

The first and second sets of cross key connections support the scroll (42) on the engine block such that relative radial thermal growth between the engine block and the scroll is accommodated by radial sliding movement between the lugs (66,74) and the slots (68,78), respectively. In addition, the first and second sets of cross key connections support the scroll on the engine block for limited bodily shiftable movement in the direction of the primary axis (26) toward the mounting shoulder (28) on the engine block for sealing the scroll against the engine block.

More particularly, as the nuts (112) are tightened on the rods (104), the retaining plate (106) seats the lugs (66) on the first ceramic ring against the bottoms (72) of the slots (68) in the inner cylindrical wall segment (50). Thereafter, continued tightening of the nuts (112) bodily shifts the scroll toward the mounting shoulder (28) on the engine block until the first annular shoulder (88) engages the second annular shoulder (90) on the second ceramic ring (62). In that circumstance, continued tightening of the nuts (112) clamps the second ceramic ring against the annular mounting shoulder (28) with the flange (32), the porous element (96) and the metal plate (94) therebetween.

The porous element (96) permanently deforms or collapses in the direction of the primary axis (26) as the nuts are tightened to limit compression forces on the second ceramic ring, the scroll, and the lugs (66) on the first ceramic ring. The spacers (80) on the spider (64), bearing directly against the flange (32), limit ultimate compression of the ceramic rings by limiting the inward travel of the nuts (112) on the rods (104). When the nuts (112) are fully tightened, a gas seal is defined between the metal plate (94) and the end face (98) of the second ceramic ring (62) and between the first and second annular shoulders (88,90) on the second ceramic ring and on the inner wall segment of the scroll. The setback, D2, of the second annular shoulder (90) from the end face (92) of the second ceramic ring (62) slightly exeeds the dimension D1 to prevent deflection of the lugs (66) on the first ceramic ring (60).

I claim:

1. In a gas turbine engine having a metal engine block including a cylindrical wall aligned on a primary axis of said engine block and terminating at an annular mounting shoulder in a plane perpendicular to said primary axis, and a ceramic scroll around said cylindrical wall including an annular nozzle defined between a generally cylindrical inner wall segment of said scroll and a generally cylindrical outer wall segment of said scroll each aligned on said primary axis, a mounting for said scroll on said engine block comprising:

a first ceramic ring, means defining a first cross key connection between said first ceramic ring and said cylindrical inner wall segment of said scroll and a second cross key connection between said first ceramic ring and said cylindrical wall of said engine block whereby said scroll is supported on said engine block independent of relative radial thermal growth between said engine block and said scroll and for bodily shiftable movement in the direction of said primary axis toward said mounting shoulder, means on said inner wall segment of said scroll defining a first uninterrupted annular shoulder in a plane perpendicular to said primary axis and facing said mounting shoulder, a second ceramic ring between said mounting shoulder and said first ceramic ring including an uninterrupted second annular shoulder engaged by said first annular shoulder when said scroll is bodily shifted in the direction of said primary axis toward said mounting shoulder, seal means defining a gas seal between said mounting shoulder and said second ceramic ring when said second ceramic ring is clamped against said mounting shoulder with said seal means therebetween, and clamp means operative to clamp said second ceramic ring against said mounting shoulder with said seal means therebetween by bodily shifting said scroll toward said mounting shoulder and effecting engagement of said first annular shoulder on said second annular shoulder.

2. The ceramic scroll mounting recited in claim 1 wherein said means defining a first cross key connection between said first ceramic ring and said cylindrical inner wall segment of said scroll and a second cross key connection between said first ceramic ring and said cylindrical wall of said engine block includes:

means defining a plurality of first radial lugs on said first ceramic ring, means defining a corresponding plurality of axially extending slots in said inner wall segment of said scroll slidably receiving respective ones of said first radial lugs, a steel spider rigidly attached to said mounting shoulder inside said first ceramic ring, means defining a plurality of second radial lugs on said steel spider, and means defining a corresponding plurality of slots in said first ceramic ring slidably receiving respective ones of said second radial lugs.

3. The ceramic scroll mounting recited in claim 2 wherein said seal means defining a gas seal between said mounting shoulder and said second ceramic ring when second ceramic ring is clamped against said mounting shoulder with said seal means therebetween includes:

an annular metal plate and an annular porous element each disposed between said second ceramic ring and said annular mounting shoulder.

4. The ceramic scroll mounting recited in claim 3 wherein said clamp means operative to clamp said second ceramic ring against said mounting shoulder with said seal means therebetween by bodily shifting said scroll toward said mounting shoulder and effecting engagement of said first annular shoulder on said second annular shoulder includes:

an annular retaining plate axially outboard of said first ceramic ring and engageable thereon, means mounting said returning plate on said engine block for bodily shiftable movement in the direction of said primary axis toward said annular mounting shoulder to bodily shift said first ceramic ring in the direction of said primary axis toward said annular mounting shoulder, and means defining a bottom wall in each of said axial slots in said inner wall segment of said scroll in a common plane perpendicular to said primary axis engaged by respective ones of said first radial lugs on said first ceramic ring when said first ceramic ring is bodily shifted in said direction of said primary axis toward said annular mounting shoulder.

* * * * *